Dec. 13, 1966            T. E. ORD            3,291,329
MATERIAL HANDLING TRUCK
Filed Nov. 5, 1964                                      4 Sheets-Sheet 1
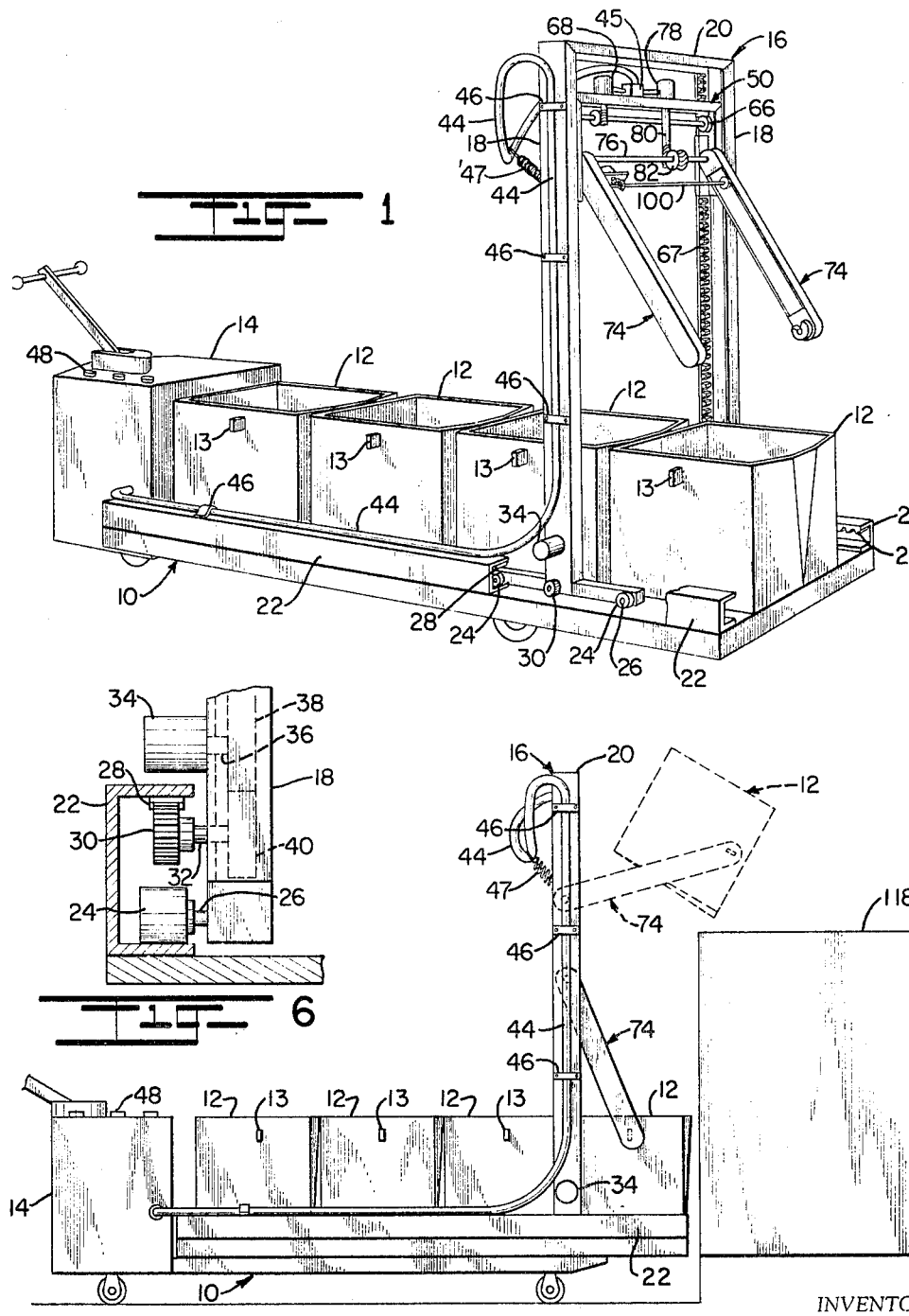
INVENTOR.
THOMAS E. ORD
BY Sheridan and Ross
ATTORNEYS

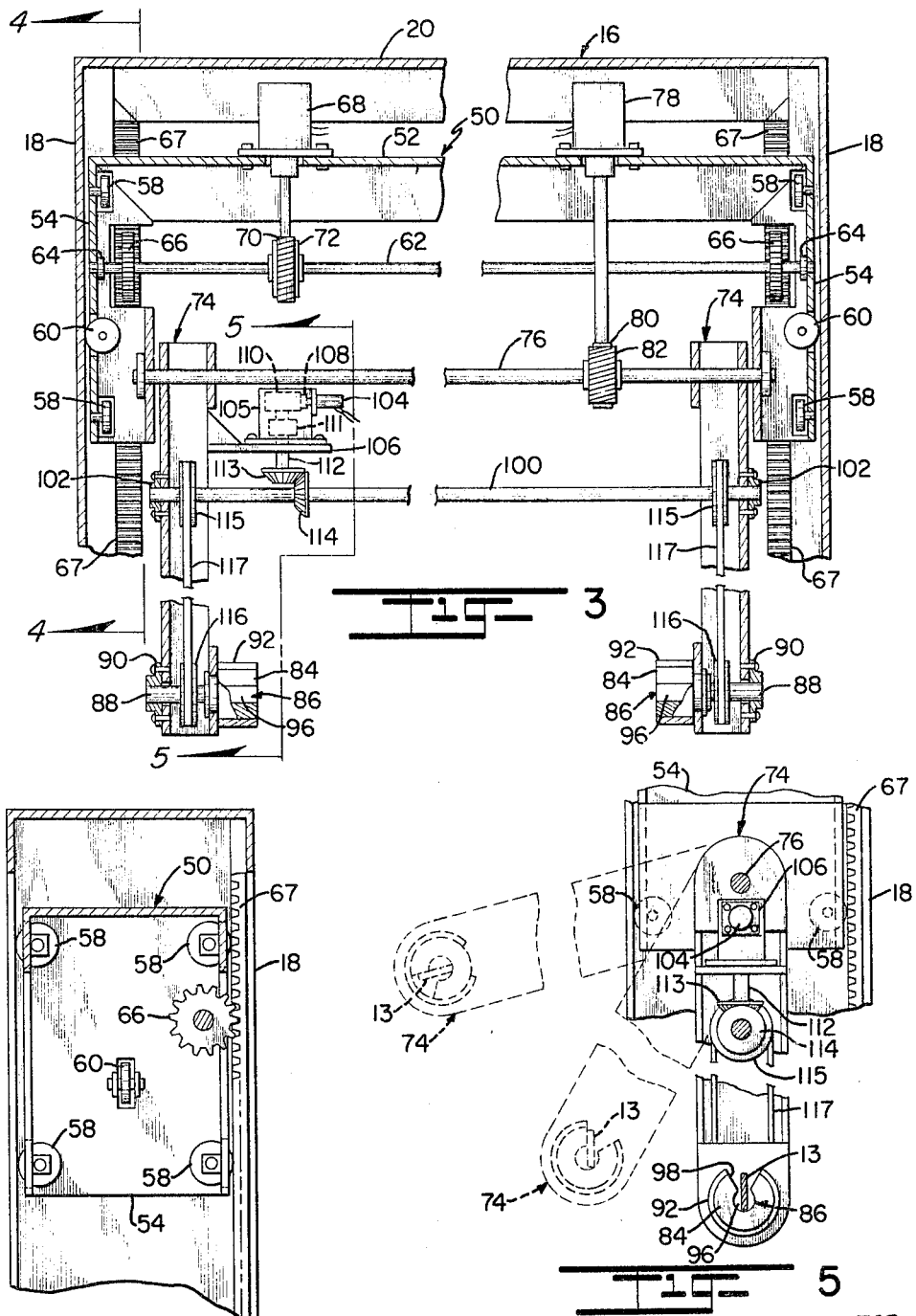

Dec. 13, 1966  T. E. ORD  3,291,329
MATERIAL HANDLING TRUCK
Filed Nov. 5, 1964  4 Sheets-Sheet 3
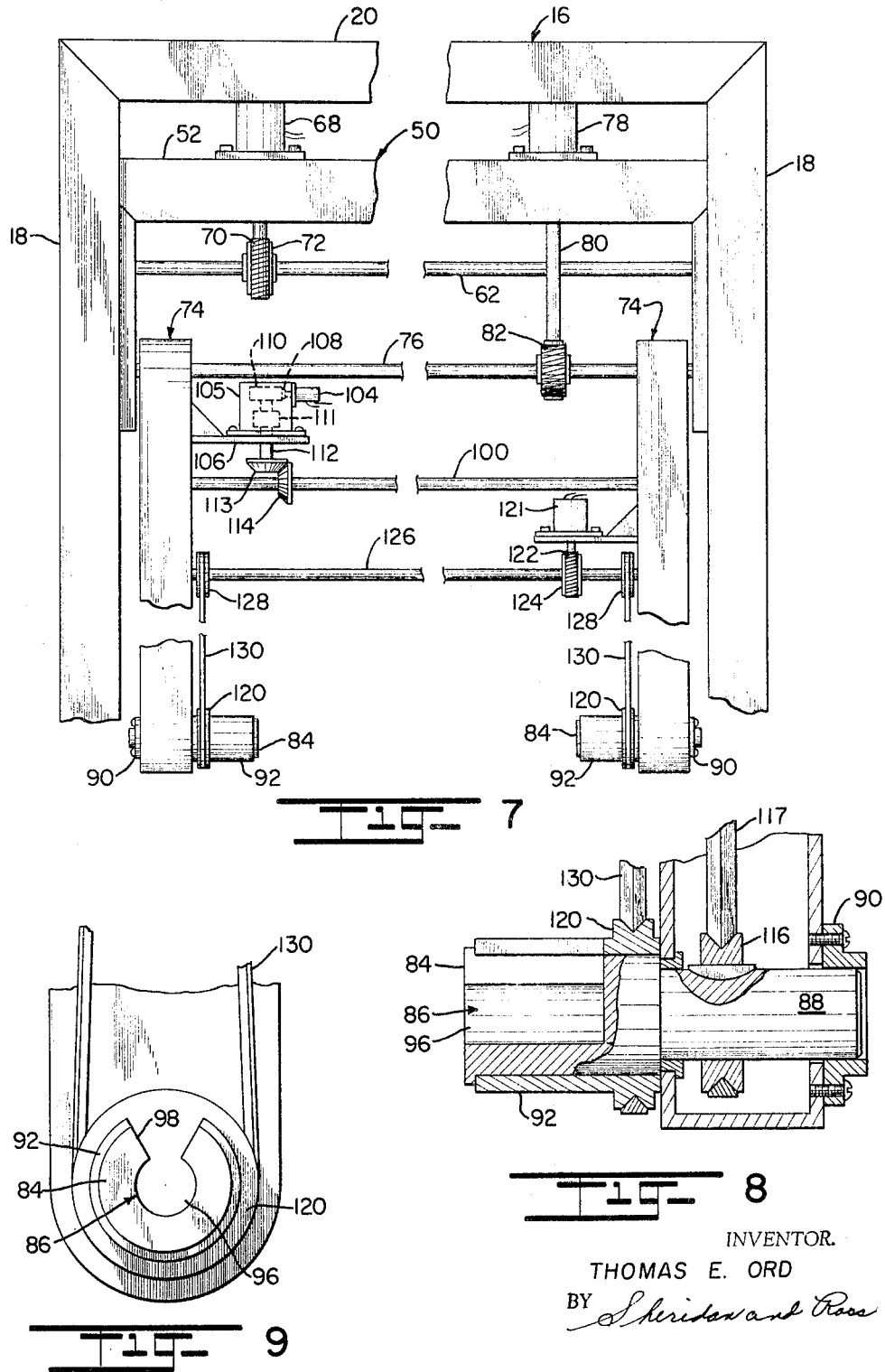

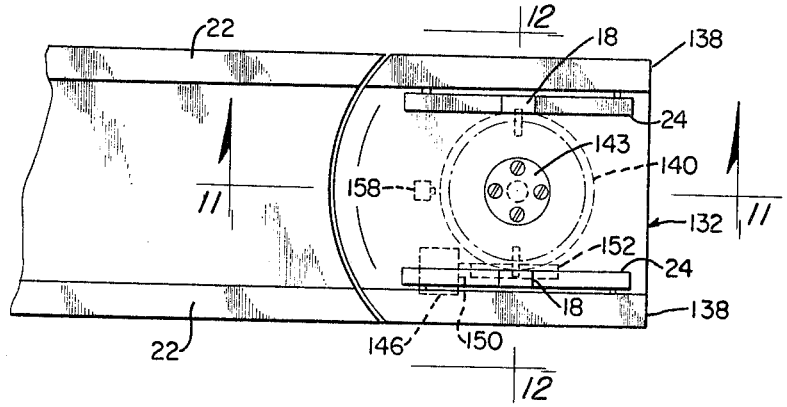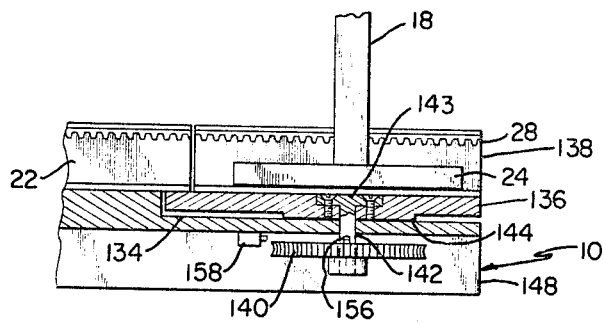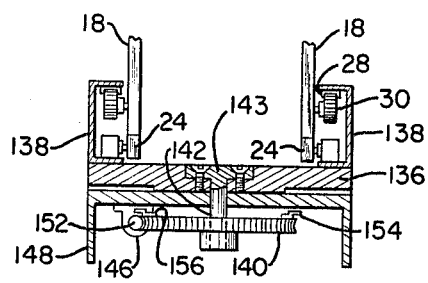

United States Patent Office 3,291,329
Patented Dec. 13, 1966

3,291,329
MATERIAL HANDLING TRUCK
Thomas E. Ord, 4210 Cook St., Denver, Colo.
Filed Nov. 5, 1964, Ser. No. 409,110
12 Claims. (Cl. 214—313)

This invention relates to a material handling device, more particularly, it relates to a self-loading and unloading material handling truck of the industrial type.

The invention is illustrated herein by its application to a small portable truck for transporting containers of material to a particular location and dumping them into a large mixing container; however, it is not limited to this application as the lifting and dumping mechanism which comprises the essential inventive feature of the invention has many other applications.

There is a recognized need in factories and manufacturing plants for a small mobile truck somewhat the size of a fork lift truck for transporting materials in containers to a desired spot and provided with means for lifting the containers and dumping them. Present industrial trucks of this type have the capability of handling only one receptacle and many of them are not constructed to dump containers into large containers located on a level above that of the platform of the truck. The fact that these prior art trucks can handle only one container is a particular disadvantage when the devices are used in laboratories where individual mixing containers receive measured quantities of material, or in large kitchens wherein related materials must be transported in separate containers to an area where they are dumped in cooking vats, mixing vessels and the like.

Another prior art expedient is to transport the containers on a trailer towed behind a lift truck so that it is necessary to dump each individual container either by hand or with a lift or handling truck. The unhooking of the trailer and continual movement of the handling truck between it and the ultimate depository of materials is inefficient and time consuming. One of the major problems which has prevented the development of trucks equipped with self-handling lifting and dumping devices is the fact that no effective means was available for positively gripping the containers, holding them in a desired oriented position prior to dumping, and dumping them into vats or large containers at various levels. Another factor is the fact that such devices in order to be economically feasible must be versatile so that they can be used not only for lifting and dumping individual containers but can also be used for stacking containers, storing them on shelves, and for other purposes.

Accordingly it is an object of this invention to provide a small mobile truck of the industrial type for transporting, lifting and dumping a plurality of individual containers.

It is another object of this invention to provide a device of the type stated in which individual containers can be positively gripped by the lifting elements, maintained in a desired orientation and dumped into vats of different levels without spilling the contents of the containers. It is still another object of this invention to provide a self-loading and unloading portable truck device which can be operated by one operator and which is capable of selective lifting and depositing containers at various positions on the platform of the truck.

It is a further object of this invention to provide a small portable industrial truck for loading, unloading, lifting and dumping a plurality of individual containers and which can be used for a variety of other purposes, such as, stacking individual containers, storing them on shelves, and for other purposes.

It is still another object of this invention to provide a device of the type stated in which the engaging mechanism for the container or receptacle can be operated by the operator to securely lock the container into the engaging mechanism.

The device embodying the invention by which the invention is illustrated comprises a self-propelled truck having a platform for receiving a plurality of individual containers with an upright mast movably mounted thereon. The mast supports a skip mechanism movable vertically thereon, the skip mechanism being provided with rotatable arms carrying engaging mechanism at their free ends for engaging containers on the platform and lifting and dumping them into vats or containers at various levels. The engaging mechanism comprises a retaining sleeve into which is seated a rotatable slotted shaft for receiving the lifting lugs on the sides of containers. The slotted shaft has a V-shaped entrance area and a circular seating area to permit entry of the container lifting lug into the slot when it is not in exact vertical alignment with the container lifting lugs. The slotted shaft is provided with power means by which it can be rotated to dump the container when it has reached the proper level. A modification of the invention includes a separate power means for the retaining sleeve so that it can be rotated independently of the slotted shaft to provide for the locking or unlocking of the lifting lugs so that the slotted shaft can be engaged or disengaged from the lugs at any desired time.

The invention is best explained by reference to the accompanying drawings wherein like parts are represented by like numerals and in which, FIG. 1 is a perspective view of a truck loaded with one tier of containers;

FIG. 2 is a side view of a truck incorporating the invention at the unloading station showing in dotted lines the position of lifting arms and container during dumping of the container;

FIG. 3 is a partial, sectional view in elevation of the top section of the mast of the truck;

FIG. 4 is a section taken on line 4—4 of FIG. 3;

FIG. 5 is a section taken on line 5—5 of FIG. 3 showing the construction of the lifting arms and the engaging mechanism;

FIG. 6 is a partial section taken in the area near the base of the mast and showing the construction by which the mast is made movable;

FIG. 7 is a partial sectional elevational view of the top section of the mast showing a different modification of the invention;

FIG. 8 is a sectional view showing the construction and mounting of the slotted shaft and retainer sleeve engaging mechanism;

FIG. 9 is a sectional view showing the manner of attaching the pulley to the sheave on the movable retaining sleeve;

FIG. 10 is a plan view of the front end rotatable section of the truck platform showing the rotating mechanism in phantom;

FIG. 11 is a sectional view taken on line 11—11 of FIG. 10; and

FIG. 12 is a cross-sectional view taken on line 12—12 of FIG. 10.

Referring now to the drawings, the self-propelled truck incorporating the invention is represented by the numeral 10. The truck is provided with wheels to make it mobile and a platform for holding containers 12 as shown. Lifting lugs 13 are attached to the sides of containers 12. A power unit 14 is supported on the rear of the platform and contains batteries or other source of power to furnish power for the truck, skip and lifting arms to be described later. A mast 16 for supporting a skip member to be described later is mounted for longitudinal movement on truck 10. The mast 16 includes side members 18 and a top member 20. These members are channel shaped with the channels turned inwardly on the mast.

For movably supporting the mast 16, two channel shaped track members 22 are secured on the top of the platform one on each side thereof. Referring now to FIG. 6 for an explanation of the method of mounting the side members 18 of the mast in the tracks 22, each side member is supported by a wheel bearing member 24 attached to the side member 18 by means of shaft 26, the bearing being rotatable with respect to the shaft by means of roller bearings or other conventional type bearings. A rack member 28 is secured to the underside of the top side of channel member 22 and a pinion gear 30 meshes with the track. Pinion gear 30 is supported on side member 18 by means of pinion shaft 32 supported in side member 18 by trust bearing or other bearing means not shown. A reversing motor 34 is mounted on the outside of member 18 and is connected by shaft 36 to pinion 38 which meshes with pinion gear 40 on shaft 32. It is thus seen that motor 34 is connected to drive pinion 30 which will, in turn, drive mast 16 back and forth along track 22. The manner of mounting the other vertical side member 18 in the other track 22 is similar to that just described, with the exception that a motor is not provided and the gear corresponding to pinion gear 30 rides loosely in the rack 28 in the other track 22. Further support for supporting upright members 18 vertically may be provided if needed. It should be understood that the described structure of mounting the mast 16 on the truck forms no part of the invention and is merely one of various methods for doing this. By suitable change in structure the mast may be mounted on a rotatable support or turntable to permit picking up bins or containers located along the sides of the platform or at any orientation with respect to the platform.

Reference is now made to FIGS. 10, 11 and 12 for a description of a modification providing for rotation of the mast to pick up containers along the side of the truck. In this modification, the front end 132 of the platform has been undercut at 134 as shown in FIG. 11 and a rotatable support plate or turntable 136 mounted in the undercut portion. The support plate 136 supports the sectioned ends 138 of tracks 22 which in turn support the wheel bearing members 24 on which the side members 18 of the mast are supported.

A circular driven pinion 140 is attached by means of shaft 142 to turntable 136 by means of stud 143 so that the two rotate together with the bottom of the boss 144 forming a bearing surface on the top of cutout portion 134. A ball bearing race can be positioned between the boss 144 and its contact area with cutoff portion 134. A reversible electric motor 146 is mounted on the inside of flange 148 of platform 10. The motor is connected by shaft 150 to driving worm gear 152 which meshes with driven pinion 140 to drive the turntable 136. Interrupter limit contacts 154 and 156 are mounted opposite each other on driven pinion 140 to cooperate with a suitably placed switch 158 to limit the arc of rotation of turntable 140. Conventional stop switches can also be provided to limit the travel of members 24 fore and aft when such travel is necessary. Electrical connections not shown are provided between the motor 146 and the control panel and between the interrupter switches and the motor.

In operation, by actuation of a suitable button on the control panel the turntable 136 bearing the mast can be rotated to a suitable position for picking up a container along the side of the truck. The arms 74 then are actuated to lift the container and place it on the front section 132 of the platform and the section 132 and the mast then rotated in the opposite direction to the forward position. The interrupter limit switches prevent overturning of the turntable with consequent damage to the mechanism.

The electrical leads from control box 14 to motor 34 and the various solenoid motors carried on the skip and lifting arms, to be described later, are enclosed in master cable 44 supported on the top of channel member 22 and on the side of mast 18 by means of clamps 46. The master cable 44 connects to junction box 45 supported on skip 50 and is long enough to provide a loop supported by a soft coil spring 47 to provide flexibility of movement as the skip moves. The leads pass out of the main cable 44 to the various motors as required. The master cable 44 may be allowed to hang freely as the mast moves back and forth horizontally on tracks 22 or retractible means, such as, a powered take-up spool may be provided in power pack 14 for winding and unwinding it with movement of the mast. Control panel 14 is provided with control buttons 48 to control the operation of the motors which are wired for forward and advance drive. The control buttons may be located on the gripping bar of the handle or the motors can be made operable by movement of the handle.

Reference is now made to FIGS. 3, 4 and 5 for a description of the mounting and operation of the skip and lifting arms. The skip 50 is constructed of channel shaped members and includes top member 52 and side members 54. The skip 50 is mounted for vertical movement in the mast by means of rollers 58 mounted in the sides of the skip member to provide mobility between the skip member and the back of the channel of the side members 18 of the mast, and rollers 60 mounted centrally of the side members 54 of the skip to provide mobility between the skip and the back portions of the channel members 18 of the mast. The rollers or bearings between the skip member and the mast are not absolutely necessary and may be dispensed with as desired.

As part of the mechanism for moving the skip up and down in the mast, the skip is provided with skip shaft 62 rotatably mounted in the sides 54 of the skip by means of thrust bearings 64 as shown, or otherwise. The shaft 62 carries power pinion gears 66 at either end which mesh respectively with racks 67 mounted on the channel sides 18 of the mast. For powering the skip shaft a skip motor 68 is mounted on the top 52 of the skip as shown and is connected to the shaft 62 by a worm gear arrangement consisting of worm gear 70 meshing with worm pinion 72 attached to shaft 62. The skip motor 68 is wired as a reversing type motor in order to rotate the shaft 62 in either direction. It will be seen that the power arrangement of skip motor 68, worm gear 70 meshing with worm pinion 72 on shaft 62 carrying pinions 66 meshing with racks 67 provides a means for propelling the skip 50 up and down in the mast 16.

For lifting bins, containers, etc. and for dumping them, the skip 50 is provided with rotatably mounted lift arms 74 constructed of channel shaped members. The lift arms 74 are fixedly mounted to lift arm shaft 76 which passes through the channel sides of the lift arms and is rotatably mounted at either end in the inner channel sides of side members 54 of the skip 50, by means of flange bearings as shown. The lift arm shaft 76 is powered for rotation in either direction by means of lift arm motor 78 positioned on the top 52 of the skip and connected to lift arm shaft 76 through a worm gear arrangement consisting of worm gear 80 meshing with worm pinion 82 fixed to shaft 76. Motor 78 is a reversing type motor like motor 68. It is thus seen by the arrangement described that the lift arms 74 can be rotated by means of power shaft 76 powered by motor 78 through worm gear arrangement of worm gear 80 and pinion gear 82.

The bin or container supporting and dumping mechanism at the end of the lift arms 74 and the mechanism for powering it, will now be described by reference to FIGS. 3, 5 and 8. As the securing mechanism is identical for both arms, it will be described with reference to one arm only. The securing mechanism by which a bin or container is supported at the end of each lift arm includes a slotted shaft 84 provided with slot 86 and rotatably mounted internally of the lift arm by means of inwardly attached mounting shaft end 88 and flange bearing 90.

The slotted shaft 84 is rotatably mounted in locking sleeve 92 mounted in this modification in a fixed position to lift arm 74. The locking sleeve 92 is provided with an upwardly facing slot and rotation of the slotted shaft brings the slots into and out of register. As shown in FIG. 5, the slot 86 is constructed with a longitudinal bore 96 having an entrance consisting of sloping guide surfaces 98 to guide lifting lug 13 of a bin or container 12 into the slot 86. It will be noted that the longitudinal bore facilitates entry into the slotted shaft of container lug when the arms are at an angle with the lug as shown in the second position of the lifting arm in FIG. 5 for example. It will be seen that if the slotted shaft is rotated through a slight angle the top of lug 13 will pass radially beyond the entrance and be locked in the slot 86 by locking sleeve 92. It will be further observed that if a bin is lifted to its dumping position it can be dumped by power applied through the slotted shaft 84 to lifting lug 13 to rotate it.

The means for rotating lifting lug 84 will now be described with particular reference to FIG. 3. Power shaft 100 is rotatably mounted in lifting arms 74 by means of flange bearings 102 as shown. The shaft 100 is powered by power shaft motor 104 mounted on gear and clutch housing 105 on platform 106 which is attached to one lifting arm. The motor 104 is connected to power shaft 100 through worm gear 108, worm pinion 110, electrically operated clutch 111, shaft 112 and meshing helical gears 113 and 114 mounted, respectively, on shafts 112 and 100. Motor 104 is a reversing motor of the same type as motors 68 and 78. Power for the motor is provided by power pack 14 through connections as shown which are carried by master cable 44. A sheave 115 is fixedly attached to power shaft 100 and a similar sheave 116 (FIG. 8) is fixedly attached to mounting end 88 of slotted shaft 84. For transferring power from shaft 100 to mounting shaft 88, the sheaves are connected by belts 117. It is thus seen that the slotted shaft 84 can be rotated in either direction by reversing motor 104 connected to power shaft 100 through worm gear 108, worm pinion 110, clutch 111, shaft 112 and pinion gears 113 and 114, the power being transferred from shaft 100 to mounting shaft 88 by means of sheaves 115 and 116 and belts 117.

By means of electrically operated clutch 111 the power shaft 100 and thus the slotted shaft 84 can be declutched to permit free rotation of the shaft in sleeve 92. The slotted shaft 84 must be declutched for free rotation during the lifting operation so that a bin or container will be maintained in vertical orientation by gravity as it is being lifted by the lifting arms.

Reference is now made to FIG. 5 for a description of the operation of the lifting and dumping mechanisms at the ends of the lift arms 74. Since the mechanisms are identical, description of one will suffice. In FIG. 5 the lift arm is shown in a vertical position and, by dotted lines, in two positions during the lifting sequence. After the lifting lugs have been engaged in the slotted shafts 84 clutch 111 is disengaged to render the slotted shaft freely rotatable.

As the lifting arms are raised the slotted shaft rotates freely so that the lugs and thereby the container being lifted are maintained in vertical orientation. When the lift arm has reached the dumping position as shown in dotted lines in FIG. 2, power is applied through motor 104 to the slotted shaft 84 to dump the container. The position of lifting lug 13 in the upper position of the lifting arms (FIG. 5) indicates that the container has been dumped into at 118 (FIG. 2). An alternate arrangement is to construct the bottom of the slot 86 with straight sides rather than with the longitudinal bore so that the lug will be held securely in the slot. This modification, of course, does not provide entry of lugs into the slot from various orientations as does the modification just described.

It is seen from the above description that the lifting lug engaging slot of the securing mechanism shown in FIG. 5 does not have parallel side walls. The side walls of this device are angularly opposed to form a V-type construction. The apex or bottom point of the "V" terminates in a horizontally bored aperture extending into the shaft. The unique function of these angularly opposed side walls and boring of the shaft permits entry or removal of the lifting lugs of a container when a center line, vertically drawn to bisect the angle formed by the sloping surfaces, is not in perpendicular alignment with the lifting lug. These angularly opposed surfaces in combination with the circular bore permit a wrench jaw contact with the lifting lug in the dumping operation. The inwardly opposed ends of each slotted shaft will be encompassed in part by a split cylinder type of locking sleeve which is stationary with respect to the slotted shaft so that when the slotted shaft with the lifting lug in the slot rotates relative to the split cylinder the latter will serve as a lock to hold the lifting lug in the slot.

The operation of the device as described to this point is as follows. Bins or containers 12 filled with measured amounts of fluids or solids are loaded on the deck of the truck 10 and transported to a mixing vat 118 into which the containers are dumped. In most installations, these vats are raised above the floor level for sanitary purposes and for other reasons. When a dumping station has been reached, the skip 50 is adjusted to the proper height by the buttons on power unit 14 which actuate the skip motor 68. By means of the proper control button on power unit 14, the lifting arms 74 are rotated by means of motor 78 until the securing means at the end of the arms is in the proper orientation with the lifting lugs 13. By use of the proper control button, the motor 104 is energized to move the slotted shafts 84 so that the entrance to each slot 86 is oriented properly for engaging the lifting lugs 13. When the lifting lugs 13 on either side of the container are securely engaged in the slots, the slotted shaft is made freely rotatable by disengagement of clutch 111 and motor 78 is actuated to lift the container to the dumping position, the container being maintained in vertical orientation by gravity during the lifting. Once the container is in dumping position over the vat, motor 104 is energized to rotate slotted shaft 84 to dump the container into the vat. The empty container can then be replaced on the deck and a container rearwardly or forwardly of it can be selectively dumped by repeating the operation just described for the first container.

Reference is now made to FIGS. 7, 8, and 9 for a description of the construction and operation of a modification of the invention which adds to its versatility and makes it useful in additional applications. The modification makes possible the rotation by the operator of the outer locking sleeve 92 with respect to the slotted shaft 84. This is useful in applications wherein containers are to be stacked on shelves or otherwise rather than dumped, and permits the rotation of the outer sleeve to an unlocking position when a container is placed on a shelf with its lifting lug locked in the slotted shaft by the outer locking sleeve 92. By this modification the outer sleeve 92 can be rotated to the unlocking position so that the engaging mechanism can be freed from the lifting lug.

Referring now to FIGS. 7, 8, and 9, the locking sleeve 92 is provided with a sheave 120 made integrally with the sleeve or attached thereto by any suitable means, for the purpose of transferring power to the locking sleeve 92. The sheave 120 is driven by reversing motor 121 connected by worm gear 122 meshing with worm pinion 124 fixedly attached to sleeve shaft 126 rotatably mounted in lifting arms 74 by thrust or flange bearings, the sleeve shaft 126 having sheave 128 fixedly mounted thereto and drivingly connected by belt 130 to sheave 120 fixedly attached to locking sleeve 92. Power from the power unit 14 for driving motor 121 is transmitted by means of connections as shown which are led to the motor from the power unit through master cable 44.

It is thus seen from the above described construction, that power can be applied by the operator through actuation of the proper buttons on the power unit 14 to either sheave 116 or 120 to move the locking sleeve 92 relative to the slotted shaft 84 and vice versa. Power from the reversing motor 121 is applied through worm gear 122, worm pinion 124, shaft 126, sheave 128, and belt 130 to sheave 120 to rotate locking sleeve 92 relative to slotted shaft 84.

The above described modification of course can be used in all the applications in which the modification disclosed in FIGS. 3, 4, and 5 can be used. Additionally, this modification can be used for stacking filled containers on the floor, for placing them on shelves, etc. As the slotted shaft 84 is made freely rotatable in locking sleeve 92 by disengagement of clutch 111 during the lifting operation, the container being lifted will always be properly oriented vertically by gravity and the locking sleeve will be over the entrance to groove 82 to lock the lug 13 in the groove when the lifting arm is in its top position. If a container is placed on a shelf it is necessary to rotate the locking sleeve relative to the slotted shaft to move it to an unlocked position so that the lifting arms can be lowered and thereby disengaged from the lifting lugs 13. In this modification, this is possible through the provision of the above described means for rotating the locking sleeve 92 relative to the slotted shaft 84.

It is thus seen from the above description that the invention provides a material handling truck of the intrafactory type adapted for self-loading of a plurality of receptacles, and capable of transporting them to a desired location, lifting the receptacles to an elevated vat and dumping them therein, followed by replacement of the empty vessels onto the carrying section of the truck. Further, the invention provides a handling mechanism whereby certain receptacles or containers may be selectively removed from, or replaced in, the carrier section of the truck, ahead of or behind other positioned containers thereon. The unit embodying the invention is also capable of removing or depositing containers, either filled or empty, upon floors, tables, or shelving of various height. The invention provides an engaging mechanism into which the container or receptacle being handled can be securely engaged or locked at the discretion of the operator, with no sacrifice of handling ease. The container engaging mechanism is easy to operate and does not require accurate pre-positioning of the container. The entire handling operation can be performed within the operator's vision. The construction of the mechanism of the invention is simple, has a minimum of parts and is entirely reliable with the parts so constructed and arranged that there is a minimum of wear and replacement problems.

Obviously, many other modifications and variations of the present invention are possible in the light of the teachings given hereinabove. It is, therefore, to be understood that, within the scope of the appended claims, the invention can be practiced otherwise than as specifically described.

What is claimed is:

1. Material handling apparatus comprising: a mobile platform for supporting material to be handled; a vertically aligned mast mounted for horizontal and rotational movement on said platform, said mast including opposed channel members each having a rack mounted internally thereof; a skip mounted on said racks for vertical movement; at least two lift arms mounted by one end to said skip for vertical pivotal movement; article engaging means mounted at the free ends of said lift arms; and means for moving said article engaging means relative to said lift arms.

2. The apparatus of claim 1 in which said article engaging means are on the inside of the lift arm, and each article engaging means includes a retaining sleeve and a slotted shaft movable relative thereto.

3. The apparatus of claim 2 including rotating means for rotating said slotted shaft relative to said retaining sleeve.

4. The apparatus of claim 3 including clutch means for clutching and unclutching said rotating means with respect to said slotted shaft.

5. The apparatus of claim 2 including means for rotating said retaining sleeve relative to said slotted shaft.

6. The apparatus of claim 2 in which the slot in said slotted shaft includes a V-shaped entry section and a circular seating section.

7. Material handling apparatus comprising: a platform for supporting container means to be dumped; a vertically aligned mast mounted for horizontal movement on said platform; skip means mounted on said mast for vertical movement; at least two lift arms mounted by one end to said skip means for rotation about said one end; article engaging means on the free ends of said lift arms; and means for operating said article engaging means independently of the operation of said lift arms.

8. The apparatus of claim 7 in which the article engaging means comprises a slotted shaft for receiving lifting means on a container mounted for rotation in a retaining sleeve.

9. The apparatus of claim 8 including rotating means for rotating said slotted shaft relative to said retaining sleeve and clutch means for clutching and unclutching said rotating means with respect to said slotted shaft.

10. The apparatus of claim 8 including means for rotating said retaining sleeve relative to said slotted shaft.

11. The material handling apparatus of claim 7 in which said vertically aligned mast is mounted for rotational as well as horizontal movement.

12. Material handling apparatus comprising: a mobile platform for supporting containers to be dumped; a vertically aligned mast mounted for horizontal movement on said platform comprised of two upright side members of channel construction connected at the top by a cross member, said side members mounted with the channels facing inwardly; track means on either side of said platform; means associated with said track means for vertically supporting said mast therein and for moving said mast horizontally thereon; rack means mounted in the channel of each side member; skip means mounted on said rack means for vertical movement; means for moving said skip means vertically on said rack means; a pair of lift arms rotatably mounted by one end on said skip of channel construction with the channels facing inwardly; means for rotating said lift arms about said one end; article engaging means mounted at the other end of said lift arms comprising a slotted shaft for receiving lifting means of a container rotatably mounted in a slotted retaining sleeve; first rotating means for rotating said slotted shaft relative to said retaining sleeve; second rotating means for rotating said retaining means relative to said slotted shaft; and clutch means for unclutching said first rotating means to permit free rotation of said slotted shaft in the retaining sleeve.

References Cited by the Examiner

UNITED STATES PATENTS 3,127,039   2/1964   Christiansen   214—313

FOREIGN PATENTS 986,343   3/1951   France.
763,651   12/1956   Great Britain.

HUGO O. SCHULZ, *Primary Examiner.*